US012432686B2

(12) United States Patent
Wen et al.

(10) Patent No.: US 12,432,686 B2
(45) Date of Patent: Sep. 30, 2025

(54) SIGNAL PROCESSING METHOD AND APPARATUS, DEVICE, AND STORAGE MEDIUM FOR DETERMINING POSITION OF BASE STATION

(71) Applicant: BEIJING BAIDU NETCOM SCIENCE TECHNOLOGY CO., LTD., Beijing (CN)

(72) Inventors: Jiatu Wen, Beijing (CN); Wei Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 376 days.

(21) Appl. No.: 18/174,771

(22) Filed: Feb. 27, 2023

(65) Prior Publication Data
US 2023/0217406 A1 Jul. 6, 2023

(30) Foreign Application Priority Data
Feb. 28, 2022 (CN) .......................... 202210191879.7

(51) Int. Cl.
H04W 64/00 (2009.01)
(52) U.S. Cl.
CPC ................................. *H04W 64/003* (2013.01)
(58) Field of Classification Search
None
See application file for complete search history.

(56) References Cited

U.S. PATENT DOCUMENTS

| 2009/0291673 | A1* | 11/2009 | Chauvigne | ............ | H04W 4/029 |
| | | | | | 455/414.3 |
| 2017/0215166 | A1* | 7/2017 | Disatnik | ............... | G01S 5/0295 |
| 2022/0366336 | A1* | 11/2022 | Khasis | ..................... | G08G 1/04 |

FOREIGN PATENT DOCUMENTS

| CN | 103167410 A | 6/2013 |
| CN | 103179509 A | 6/2013 |
| CN | 103209475 A | 7/2013 |
| CN | 103442434 A | 12/2013 |
| CN | 104620664 A | 5/2015 |

(Continued)

OTHER PUBLICATIONS

Office Action of corresponding Chinese Application No. 202210191879.7, dated Sep. 20, 2023, 10 pages.

(Continued)

*Primary Examiner* — German Viana Di Prisco
(74) *Attorney, Agent, or Firm* — Tucker Ellis LLP

(57) ABSTRACT

The present disclosure provides a signal processing method and apparatus, a device, and a storage medium. The method includes: acquiring a signal set to be processed that carries base station information and base station access time; determining a first signal subset that further carries position information in the signal set to be processed; determining position information of a base station of a first type deployed in a subway station according to the base station information and the position information that are carried by the signal of the first signal subset; and determining position information of a base station of a second type deployed in a subway tunnel according to the position information of the base station of the first type, and the base station information and base station access time that are carried by the signal of the signal set to be processed.

16 Claims, 9 Drawing Sheets

(56) References Cited

FOREIGN PATENT DOCUMENTS

| | | |
|---|---|---|
| CN | 105425115 A | 3/2016 |
| CN | 107295182 A | 10/2017 |
| CN | 208609206 U | 3/2019 |
| CN | 110446255 A | 11/2019 |
| CN | 110667652 A | 1/2020 |
| CN | 210129033 U | 3/2020 |
| CN | 111405466 A | 7/2020 |
| CN | 111624640 A | 9/2020 |
| CN | 112182132 A | 1/2021 |
| CN | 112255659 A | 1/2021 |
| CN | 113163331 A | 7/2021 |
| CN | 113727276 A | 11/2021 |
| JP | 2001-359137 A | 12/2001 |
| JP | 2010-531583 A | 9/2010 |
| JP | 6296454 B2 | 3/2018 |
| JP | 2019-090669 A | 6/2019 |
| KR | 20100021747 A | 2/2010 |
| KR | 20110061978 A | 6/2011 |
| KR | 10-2012-0078159 A | 7/2012 |
| KR | 20210045609 A | 4/2021 |

OTHER PUBLICATIONS

Nour Zaarour et al., "Connectivity-Based Joint Parameter Estimation in One-Dimensional Wireless Sensor Networks", 2020 International Wireless Communications and Mobile Computing (IWCMC), Jul. 27, 2020, 7 pages.

Notice of Reasons for Refusal of corresponding Japanese Application No. 2022-128884, dated Aug. 18, 2023, 6 pages.

Wang Lisen, "Base Station Configuration Based on Millimeter Wave Transmission Characteristics in Subway Scene", China Academic Journal Electronic Publishing House, dated Jul. 15, 2020, 55 pages.

Huang Peng, "Talking about subway indoor coverage", China Academic Journal Electronic Publishing House, dated Mar. 10, 2008, 5 pages.

Chen Qinghao, "Mobile network switching in urban rail transit", Jiangsu Post and Telecommunications Design Institute, dated Jul. 16, 2012, 4 pages.

Written Opinion of corresponding Korean Application No. 10-2022-0100768, dated Oct. 22, 2024, 13 pages.

Notification of Grant of Patent Rights for Invention Application of corresponding Chinese Application No. 202210191879.7, dated Nov. 27, 2023, 7 pages.

* cited by examiner

SIGNAL PROCESSING METHOD AND APPARATUS, DEVICE, AND STORAGE MEDIUM FOR DETERMINING POSITION OF BASE STATION

CROSS-REFERENCE TO RELATED APPLICATION

This application claims priority to Chinese Patent Application No. 202210191879.7 filed on Feb. 28, 2022, which is hereby incorporated by reference in its entirety.

TECHNICAL FIELD

The present disclosure relates to the field of intelligent transportation, the Internet of Things, and intelligent search technologies in data processing technologies, and in particular, to a signal processing method and apparatus, a device, and a storage medium.

BACKGROUND

With the rapid development of subway transportation, more and more users choose to travel by subway. In the process of a user traveling, especially in the process of choosing to travel by subway, the position of the user is usually determined by using a method of base station positioning.

In related art, base station positioning is usually determined by adopting a method of manually collecting data, that is, manually collecting the information of base stations and WiFi within a specific position range, and then performing manual processing on the information, to determine the position information of base stations in subway stations and subway lines. However, there is a problem of low processing efficiency and high labor cost in this method.

SUMMARY

The present disclosure provides a signal processing method and apparatus, a device, and a storage medium.

According to a first aspect of the present disclosure, a signal processing method is provided, including:
  acquiring a signal set to be processed, where a signal of the signal set to be processed carries base station information and base station access time;
  determining a first signal subset of the signal set to be processed, where a signal of the first signal subset further carries position information;
  determining, according to the base station information and the position information that are carried by the signal of the first signal subset, position information of a base station of a first type deployed in a subway station; and
  determining, according to the position information of the base station of the first type, and the base station information and the base station access time that are carried by the signal of the signal set to be processed, position information of a base station of a second type deployed in a subway tunnel.

According to a second aspect of the present disclosure, an electronic device is provided, including:
  at least one processor; and
  a memory communicatively connected to the at least one processor; where,
  the memory stores therein instructions executable by the at least one processor, and the instructions are executed by the at least one processor to cause the at least one processor to execute the method according to the first aspect.

According to a third aspect of the present disclosure, a non-transitory computer-readable storage medium is provided, which has computer instructions stored therein, where the computer instructions are used to cause a computer to execute the method according to the first aspect.

It should be understood that the content described in this section is not intended to identify the key or important features of the embodiments of the present disclosure, nor to limit the scope of the present disclosure. Other features of the present disclosure will be easily understood through the following description.

BRIEF DESCRIPTION OF DRAWINGS

The drawings are used for a better understanding of the present solution but do not constitute any limitation on the present disclosure. In the drawings.

DESCRIPTION OF EMBODIMENTS

Figure 1:
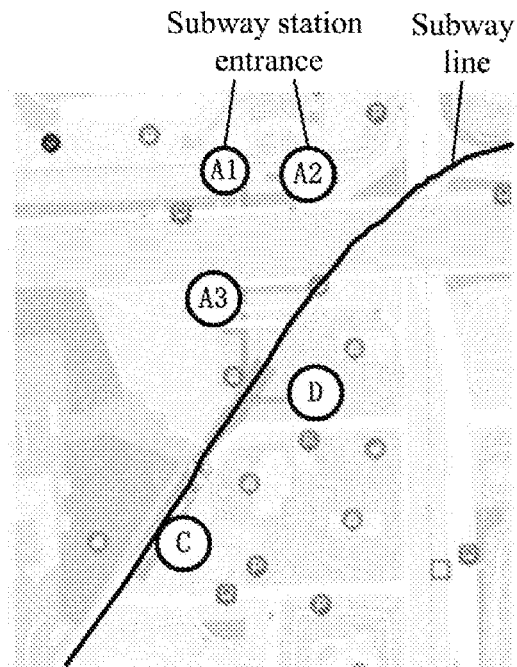
FIG. 1 is a schematic diagram of distribution of exit positions of a certain subway station.

Description is provided below for the exemplary embodiments of the present disclosure with reference to the accompanying drawings, which include various details of the embodiments of the present disclosure to facilitate understanding, which should be considered as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

Mobile phone navigation software has increasingly become an indispensable tool for people to travel, which addresses the requirements of a user for a current position and a destination position and how to arrive. The ultimate experience of user experience has always been an unremitting pursuit of navigation software. At present, positioning technologies used by mobile phone software mainly include satellite positioning and network positioning technologies. In an outdoor open area with good signals, mobile phone navigation software mainly uses satellite positioning, while satellite signals are often inaccessible indoors where signals are blocked, and network positioning technologies may be used at this time. Similarly, in the underground subway, satellite positioning signals cannot be normally received by mobile phones due to being blocked by the ground. At this time, satellite positioning cannot be used, and network positioning is also required to determine the positions of mobile phones and other terminal devices.

Satellite positioning mainly uses a positioning module such as a global positioning system (GPS) on a terminal device to send its own position reference signals to the positioning background to achieve positioning. Network positioning refers to a technology or service that acquires position information of a terminal device through a specific positioning technology and performs marking on the position information. For example, base station positioning is to determine the position of a terminal device by using a distance between a base station and the terminal device.

The application scenario of the embodiments of the present disclosure is mainly the positioning of base station positions in the subway scenario. Specifically, with the rapid development of science and technology, the subway, as a form of public transportation, has more and more construction mileage and coverage areas. However, because the subway is typically underground, when a user is on a subway or enters a subway station, the terminal device used by the user cannot use the satellite positioning method since satellite positioning signals (such as GPS signals or Beidou signals, etc.) cannot be received, and only the base station positioning can be used. The accuracy of base station positioning depends on the positioning fingerprint features of network access devices, such as wifi and base stations, uploaded by terminal devices. How to determine the position of a base station in the subway scenario is the key to ensuring the positioning accuracy of the terminal device in the subway scenario.

In related art, the positioning of a base station in a scenario such as an underground subway mainly adopts a manual collection method or a method of crowdsourcing data. The manual collection method refers to manually collecting base station information and wifi information within a specific position range, and performing manual processing on the information, and thereby determining the position information of base stations in subway stations and subway lines, which has the problem of low processing efficiency and high labor cost. The method of crowdsourcing data refers to using crowdsourcing to collect data (when a large number of users acquire positioning information through user devices, they will turn on a data switch; at this time, the user devices establish connections with base stations, determine the positions of the base stations, and send back the same to a back-end server), and mine the base station positions through a machine learning method; however, the base station positions determined in this way in the subway scenario are inaccurate, and the positioning perceived by users has jumping, fallback, positioning failure and other phenomena, which results in poor user experience.

In view of the above technical problem, the technical conception process of the technical solution of the present disclosure is as follows: through research on the distribution of base station signals in the subway, it is found that base station signals in a subway station and base station signals in a subway tunnel have different acquisition regularities. For example, a base station signal in a subway station carries both a base station identifier and position information, while a signal in a subway tunnel only carries the base station identifier. Nonetheless, base stations in a subway and base stations in a subway tunnel have some distribution patterns. Therefore, subway base stations are classified into types based on the distribution of subway signals, the position of a base station in a subway station is bound to the center of the subway station according to the subway site where the base station is located, to solve the previous problem of disorderly jumping in positioning, and the positions of respective base stations in subway tunnels are optimized depending on the positions of base stations in subway stations, which can improve the positioning of all base stations in subways.

Based on the technical conception process mentioned above, an embodiment of the present disclosure provides a signal processing method. After a signal set to be processed is acquired, a first signal subset that further carries position information in the signal set to be processed is first determined; position information of a base station of a first type deployed in a subway station is then determined according to base station information and the position information carried by signals in the first signal subset; and position information of a base station of a second type deployed in a subway tunnel is finally determined according to the position information of the base station of the first type and the base station information and base station access time carried by signals in the signal set to be processed. The technical solution improves network positioning in the subway, realizes capability of accurate positioning in the subway, and can provide users with accurate subway arrival reminders for subway travel.

The present disclosure provides a signal processing method and apparatus, a device, and a storage medium, which are applied to the field of intelligent transportation, the Internet of Things, and intelligent search technologies in data processing technologies, to improve the accuracy of base station positioning in the subway scenario, improve the processing efficiency of base station positioning, and provide users with accurate subway arrival reminders for subway travel.

It should be noted that the signal set to be processed in this embodiment comes from a public data set, and the information carried by signals in the signal set to be processed is not information for a specific user, and cannot reflect the personal information of a specific user.

In the technical solutions of the present disclosure, collection, storage, use, processing, transmission, providing, disclosure and other processing of the user's personal information involved are all in line with the provisions of relevant laws and regulations and do not violate the public order and good customs.

The embodiments of the present disclosure may be applied to a processing device, which may be a terminal device, or may also be a server, a virtual machine, or the like, or may be a distributed computer system composed of one or more servers and/or computers and the like, etc. The terminal device includes, but is not limited to, a smart phone, a notebook computer, a desktop computer, a platform computer, a vehicle-mounted device, a smart wearable device, etc., which is not limited in the embodiments of the present disclosure. The server may be an ordinary server or a cloud server. The cloud server is also known as a cloud computing server or cloud host, which is a host product in a cloud computing service system. The server may also be a server of a distributed system or a server combined with a blockchain.

It is worth noting that a product implementation form of the present disclosure is program code contained in platform software and deployed on the processing device (which may also be a computing cloud, or a mobile terminal or other hardware with computing power). For example, the program code of the present disclosure may be stored inside the processing device. When running, the program code runs in a host memory and/or a GPU memory of the processing device.

In the embodiments of the present disclosure, "a plurality of" refers to two or more; "and/or" describes an association relationship between the associated objects, which means that there can be three kinds of relationships, for example, A and/or B can mean: there are three cases where A exists alone, both A and B exist, and B exists alone. The character "/" generally indicates that the associated objects before and after are in an "or" relationship.

It can be understood that, before introducing the technical solution of the present disclosure, types of subway base stations in this embodiment are first described.

Base Station of First Type

Signals of the base station of the first type are distributed in a subway station. This type of base station is a base station used by users when using a mobile network in a subway station and has a unique base station ID. Since a user can still connect to the base station to access the Internet when the user is near an exit of the subway station, and at this time, the user's mobile phone may acquire satellite positioning signals at the same time, the base station ID and the satellite positioning position at that time can form a "base station ID—position" combination at this time. When more users use mobile phones at subway entrances, a plurality of "base station ID—position" combinations may be formed. At this time, the base station in the subway station can be determined according to the relationship between the base station ID and the position.

Figure 2:
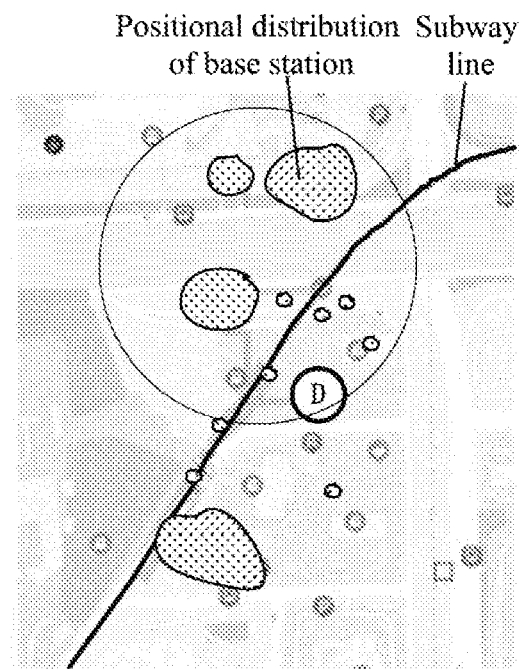
FIG. 2 is a schematic diagram of positional distribution of a base station of a first type in the subway station shown in FIG. 1.

Illustratively, FIG. 1 is a schematic diagram of the distribution of exit positions of a certain subway station. FIG. 2 is a schematic diagram of positional distribution of a base station of the first type in the subway station shown in FIG. 1. Illustratively, in the schematic diagram shown in FIG. 1, the subway entrance distribution of the subway station may include: A1, A2, A3, C, and D, all of which are located at a subway line. In the schematic diagram of the positional distribution of base stations shown in FIG. 2, the subway position signals near subway entrances are relatively dense, and the positions of the base station of the first type are mainly distributed at the positions of the subway station entrances.

It can be understood that, in this embodiment, since sent-back signals generated when user terminals use a base station in a subway station have the characteristic of the "base station ID—position" combination, and the positional distribution pattern of the base station indicated by the numerous sent-back signals is similar to the distribution pattern of the subway station entrances, the base station of the first type may be referred to as a "base station in a subway station" or a "trustable base station" in this embodiment.

Base Station of Second Type

Signals of the base station of the second type are distributed in a subway tunnel. This type of base station may only be scanned in the tunnel. At this time, the satellite positioning signals cannot be normally received by a user terminal in the tunnel due to being blocked by the ground, and thus the satellite positioning results cannot be used.

Figure 3:
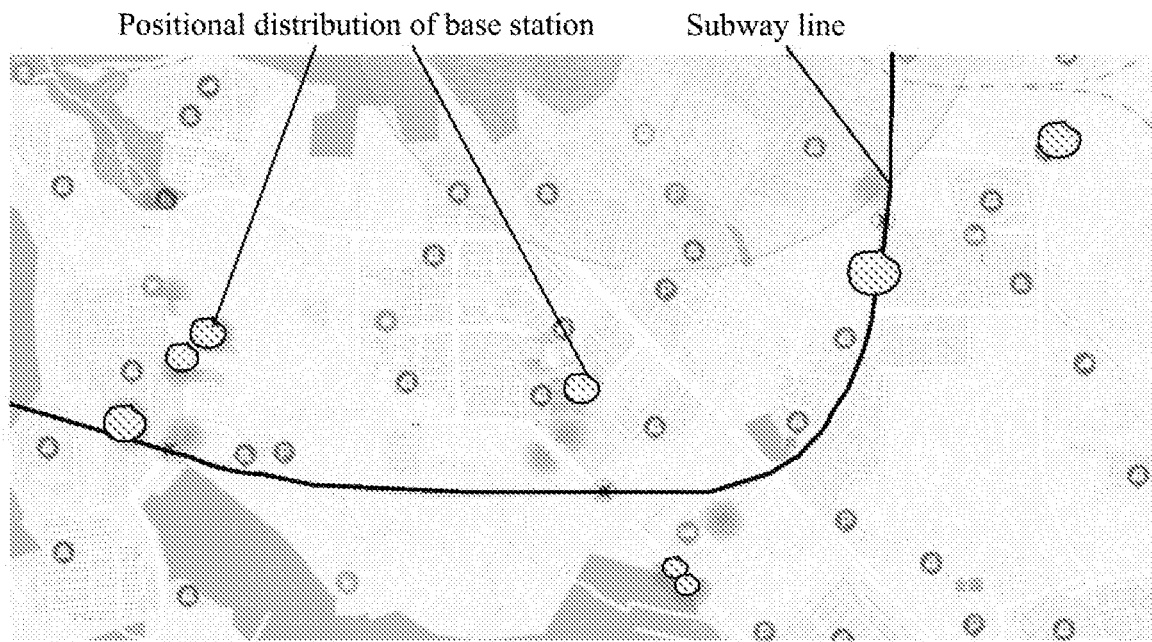
FIG. 3 is a schematic diagram of positional distribution of base stations of a second type.

Illustratively, FIG. 3 is a schematic diagram of positional distribution of base stations of the second type. As shown in FIG. 3, this type of base station (base stations in subway tunnels) often fails to form an effective "base station ID—position" combination or the positions in the combinations appear irregularly. Therefore, the base station of the second type may also be referred to as a "base station in a subway tunnel" or an "untrustable base station" in this embodiment.

Base Station of Third Type

Signals of the base station of the third type are distributed along a subway line, but the base station of the third type is not a base station in the subway, it can be scanned on the ground above the subway tunnel or near the subway station, and it is also a base station that users often use in their daily life.

Figure 4:
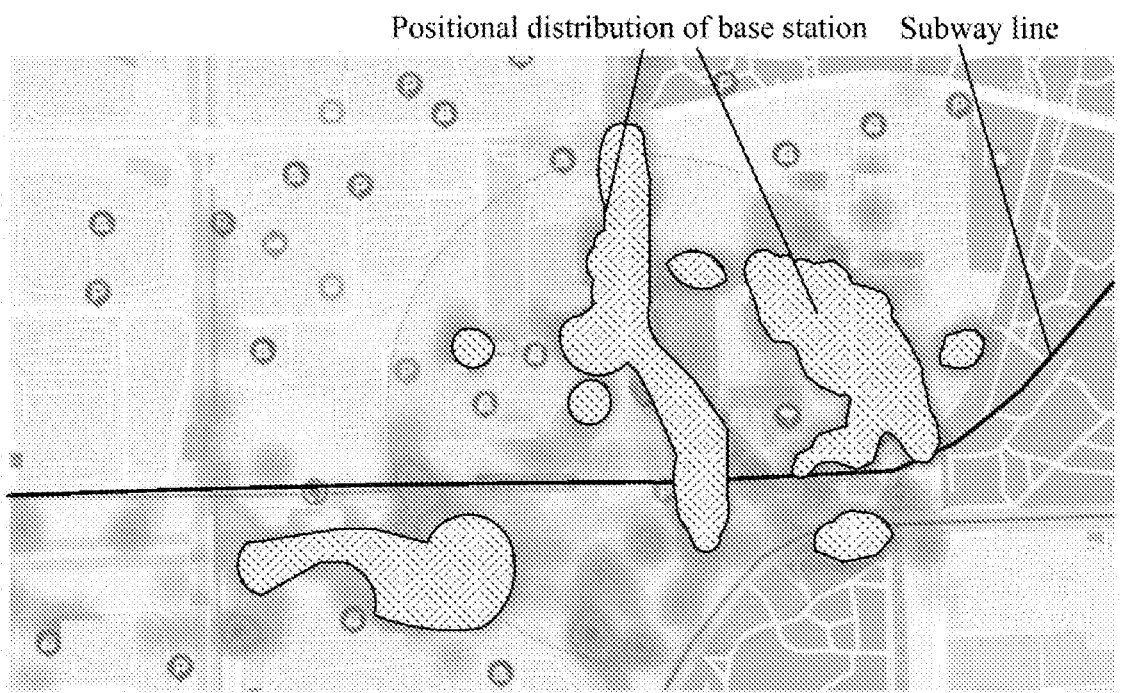
FIG. 4 is a schematic diagram of positional distribution of base stations of a third type.

Illustratively, FIG. 4 is a schematic diagram of positional distribution of base stations of the third type. As shown in FIG. 4, since signals of this type of base station are not restricted by obstacles such as ground, the base station positional distribution of this type of base station is generally very wide, and is not directly related to the subway line. In an implementation, in this embodiment, such a base station may be referred to as a "ground base station" or a "base station not inside a subway".

Hereinafter, the technical solutions of the present disclosure will be described in detail through specific embodiments in conjunction with the three types of base stations mentioned above. It should be noted that the following specific embodiments may be combined with each other, and the same or similar concepts or processes may not be repeated in some embodiments.

Figure 5:
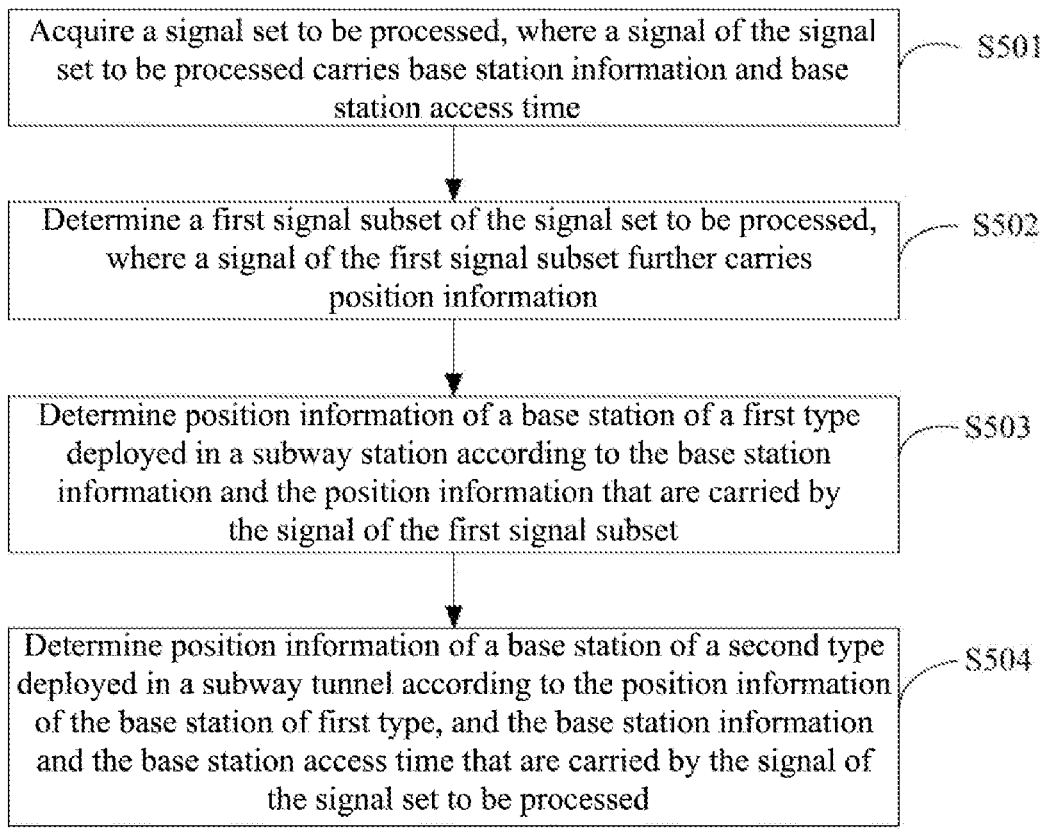
FIG. 5 is a schematic flowchart of a data processing method provided according to a first embodiment of the present disclosure.

Illustratively, FIG. 5 is a schematic flowchart of a data processing method provided according to a first embodiment of the present disclosure. The method is explained with a processing device as an execution subject. As shown in FIG. 5, the data processing method may include the steps as follows.

S501, acquire a signal set to be processed, where a signal of the signal set to be processed carries base station information and base station access time.

In the embodiment of the present disclosure, the processing device may receive a signal set from other devices, and may also read a signal set from a database stored by itself (where in this case, the processing device is deployed with a database), or it may be a signal set reported by a user terminal when using a navigation application.

It can be understood that, in the embodiment of the present disclosure, the signal set acquired by the processing device may be either a data set that has been preprocessed or a data set that is not processed, which is not limited in this embodiment.

Illustratively, the signal set in this embodiment may include a signal sent back by a user terminal at a collection point of the base station position, where the sent-back signal is an Internet access signal generated by the user terminal based on the access base station, and the collection point of the base station position is a position where both of signals of the base station and the GPS position can be received.

In an implementation, the signal set in this embodiment may also include sent-back signals reported by user terminals along a subway line, and the subway line includes both subway stations and positions in subway tunnels between the subway stations. In addition to the base station information, a sent-back signal in a subway station typically further carries position information, while a sent-back signal in a subway tunnel typically does not carry position information.

S502, determine a first signal subset of the signal set to be processed, where a signal of the first signal subset further carries position information.

Illustratively, in this embodiment, by analyzing and studying the distribution of base station signals in the subway, the signal acquisition regularities of different base stations in the subway station and the subway tunnel are found, and thus, the base stations in the subway can be classified into types.

Since the base station signal that the user terminal uses has a unique base station identifier when the user terminal uses a mobile network to access the Internet on the ground or in the subway station, and the user terminal can receive satellite positioning, at this time, besides of the base station identifier and the base station access time, the sent-back signal of the user terminal further carries position information. Therefore, in this embodiment, the first signal subset carrying the position information may also be determined from the signal set to be processed based on whether a signal carries position information.

S503, determine position information of a base station of a first type deployed in a subway station according to the base station information and the position information that are carried by the signal of the first signal subset.

In practical applications, the distribution pattern of sent-back signals generated by user terminals using base station signals in subway stations is different from the distribution pattern of sent-back signals generated by user terminals using base station signals on the ground, and thus a base station of the first type deployed in a subway station may be first determined according to the base station information and the position information carried by the signal of the first signal subset, and then the position information of the base station of the first type may be determined.

S504, determine position information of a base station of a second type deployed in a subway tunnel according to the position information of the base station of the first type, and the base station information and the base station access time that are carried by the signal of the signal set to be processed.

Illustratively, signals of the base station of the second type are distributed in a subway tunnel, and generally, this type of base station may only be scanned in the tunnel, but the base stations that a user accesses when surfing the Internet during the ride has a certain order. Therefore, in this embodiment, the processing device may determine a base station sequence used by a user in the ride of the subway from the signal set to be processed, and thereby, the position information of the base station of the second type deployed in the subway tunnel may be deduced based on the time of accessing each base station in the base station sequence and the position information of the base station of the first type already determined in the base station sequence.

In the embodiment of the present disclosure, by acquiring the signal set to be processed, determining the first signal subset that further carries position information in the signal set to be processed, determining the position information of the base station of the first type deployed in the subway station according to the base station information and the position information carried by the signal of the first signal subset, and finally, determining the position information of the base station of the second type deployed in the subway tunnel according to the position information of the base station of the first type and the base station information and the base station access time carried by the signal of the signal set to be processed, the technical solution improves network positioning in the subway, realizes capability of accurate positioning in the subway, and can provide users with accurate subway arrival reminders for subway travel.

On the basis of the embodiment shown in FIG. 5, the following describes a data processing method provided according to an embodiment of the present disclosure in more detail.

Figure 6:
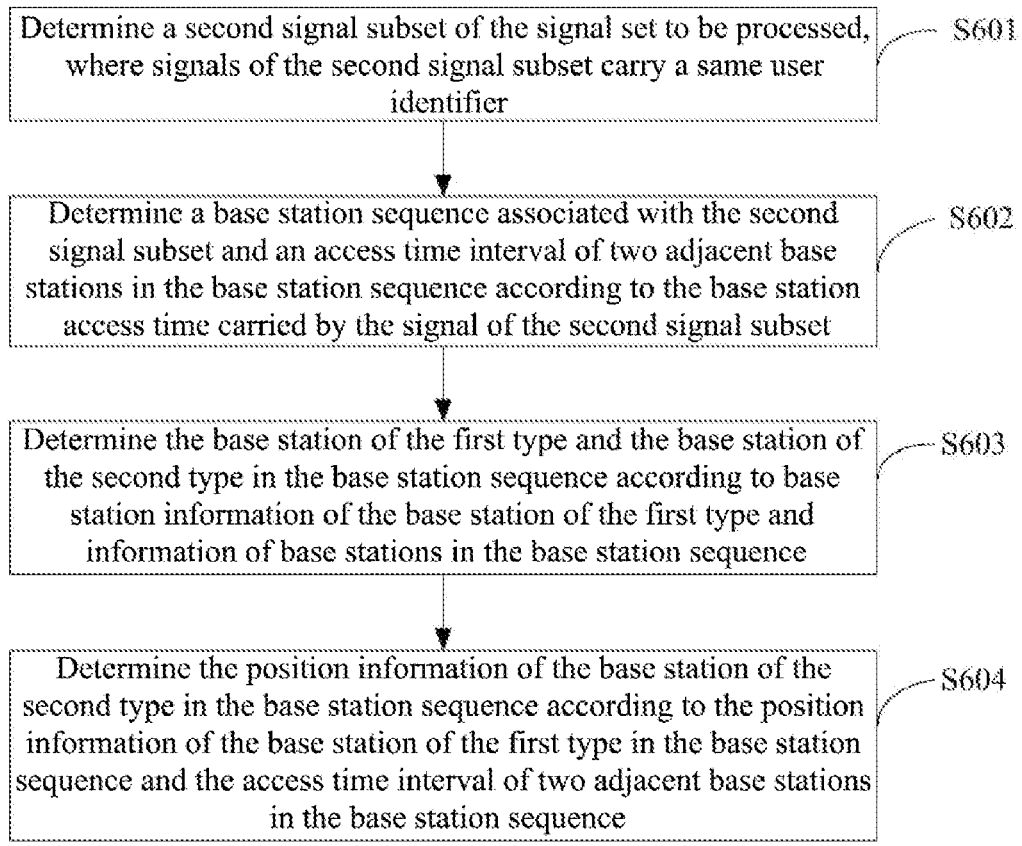
FIG. 6 is a schematic flowchart of a data processing method provided according to a second embodiment of the present disclosure.

Illustratively, FIG. 6 is a schematic flowchart of a data processing method provided according to a second embodiment of the present disclosure. As shown in FIG. 6, in an embodiment of the present disclosure, the above S504 may be implemented by the steps as follows.

S601, determine a second signal subset of the signal set to be processed, where signals of the second signal subset carry a same user identifier.

Illustratively, when a user uses a mobile phone in a subway, base station signals in the subway are continuously scanned, and base station identifiers scanned by the mobile phone of the user are different within the coverage of different base station signals. Therefore, the processing device may determine the second signal subset having the same user identifier in the signal set to be processed based on whether signals have the same user identifier.

For example, in the process of a user taking the subway, when a user terminal uses an access base station to access the Internet, the generated sent-back signal further carries a user identifier in addition to the base station information and the base station access time, and thereby, the successively scanned base station sequence of the same user can be determined based on the user identifier.

S602, determine a base station sequence associated with the second signal subset and an access time interval of two adjacent base stations in the base station sequence according to the base station access time carried by the signal of the second signal subset.

Illustratively, for the second signal subset, the base stations associated with the second signal subset may be ranked in accordance with the base station access time carried by the signals, to determine the base station sequence associated with the second signal subset and calculate the access time interval between two adjacent base stations.

Figure 7:
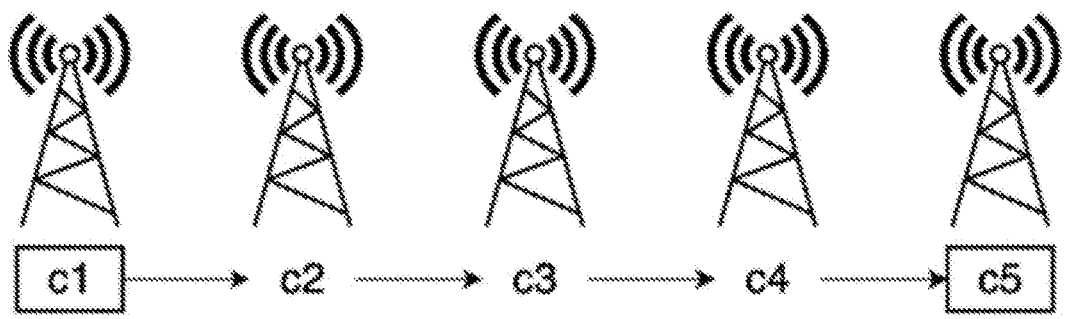
FIG. 7 is a diagram of a timing sequence relationship of base stations appearing successively in a base station sequence associated with a second signal subset.

Illustratively, FIG. 7 is a diagram of a timing sequence relationship of base stations appearing successively in a base station sequence associated with a second signal subset. As shown in FIG. 7, assuming that the base station sequence associated with the second signal subset is $c_1$, $c_2$, $c_3$, $c_4$, and $c_5$. At this time, the access time interval of any two adjacent base stations among base station $c_1$, base station $c_2$, base station $c_3$, base station $c_4$, and base station $c_5$ may be determined based on the time when a user terminal accesses base station $c_1$, base station $c_2$, base station $c_3$, base station c4, and base station c5, respectively. For example, the access time interval between base station c1 and base station c2 is t1, the access time interval between base station c2 and base station c3 is t2, the access time interval between base station c3 and base station c4 is t3, and the access time interval between base station c4 and c5 is t4.

S603, determine the base station of the first type and the base station of the second type in the base station sequence according to base station information of the base station of the first type and information of base stations in the base station sequence.

The base station of second type is a base station deployed in a subway tunnel.

In an implementation, in this embodiment, the processing device may determine, based on the base station information (base station identifier) of the base station of the first type determined in S503, the base station of the first type in the base station sequence, and the base station of the second type of which signals do not carry the position information.

Figure 8:
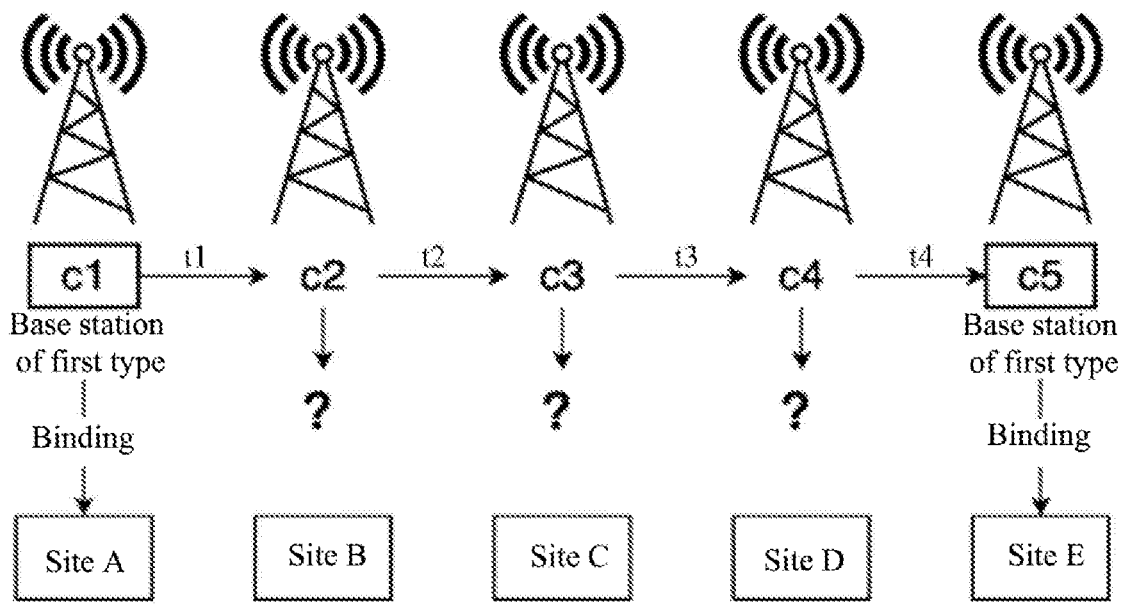
FIG. 8 is a schematic diagram of positions of base stations of the first type and base stations of the second type in the base station sequence shown in FIG. 7.

Illustratively, FIG. 8 is a schematic diagram of the positions of the base station of the first type and the base station of the second type in the base station sequence shown in FIG. 7. Referring to FIG. 8, assuming that a user has passed through five sites (subway stations) A, B, C, D, and E in total during this ride, and in the base station sequence c1, c2, c3, c4, and c5, it is assumed that base station c1 is the base station that a user terminal accesses at site A, base station c5 is the base station that the user terminal accesses at site E, and the position of base station c1 can be bound with site A, and the position of base station c5 can be bound with site E, while base station c2, base station c3 and base station c4 have no exact correspondence with sites A to E, that is, base station c1 and base station c5 are the base stations of the first type in the base station sequence, while base station c2, base station c3 and base station c4 are the base stations of the second type in the base station sequence.

S604, determine the position information of the base station of the second type in the base station sequence according to the position information of the base station of the first type in the base station sequence and the access time interval of two adjacent base stations in the base station sequence.

In this embodiment, the processing device can determine the distance information and the access time interval between two base stations of the first type based on the position information and the base station access time of the base stations of the first type, and then determine predicted positions of respective base stations of the second type between two base stations of the first type based on the access time interval between two adjacent base stations.

Figure 9:
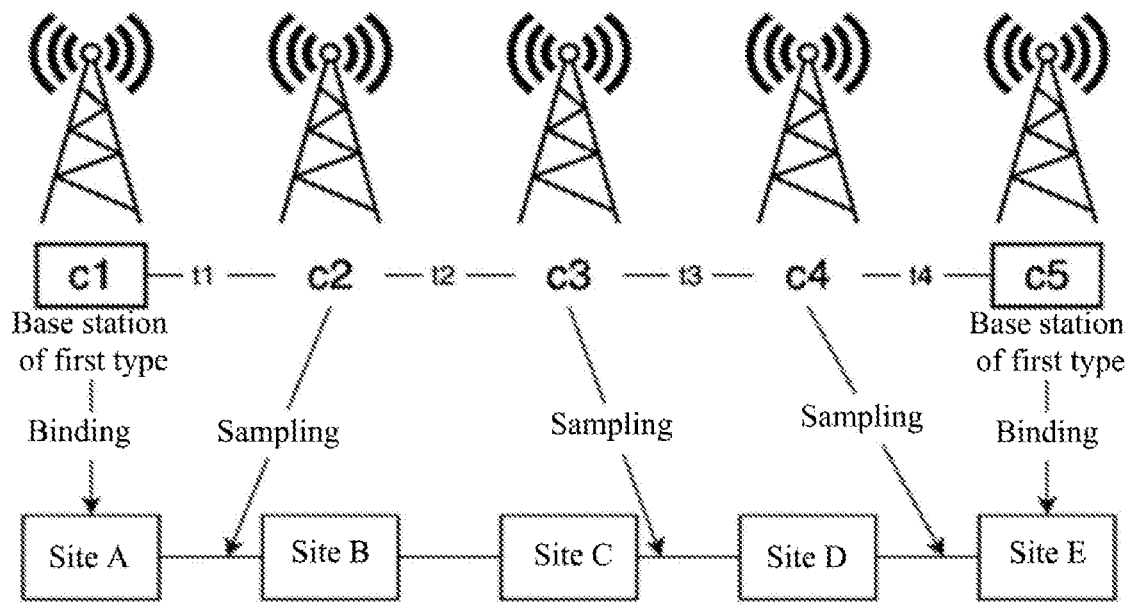
FIG. 9 is a schematic diagram of the positions of the base stations of the second type in the base station sequence in FIG. 8.

Illustratively, FIG. 9 is a schematic diagram of the positions of the base stations of the second type in the base station sequence in FIG. 8. Referring to FIG. 9, the processing device can roughly deduce the positions of base station c2, base station c3, and base station c4 after performing sampling on the positions of base stations c2, c3, and c4 in accordance with the position information of base station c1 of first type and base station c5 of first type and the access time interval between adjacent base stations.

In the embodiment of the present disclosure, the second signal subset with the same user identifier in the signal set to be processed is determined, the base station sequence associated with the second signal subset and the access time interval of two adjacent base stations in the base station sequence are determined according to the base station access time carried by the signals of the second signal subset, then the base station of the second type deployed in the subway tunnel and the base station of the first type in the base station sequence are determined, and finally, the position information of the base station of the second type in the base station sequence is determined. In this technical solution, the position information of the base station of the second type in the subway tunnel is deduced based on the position information of the base station of the first type in the subway station, which realizes the optimization of the positions of the subway base stations, and lays a foundation for improving the positioning accuracy of the position of the user terminal.

Figure 10:
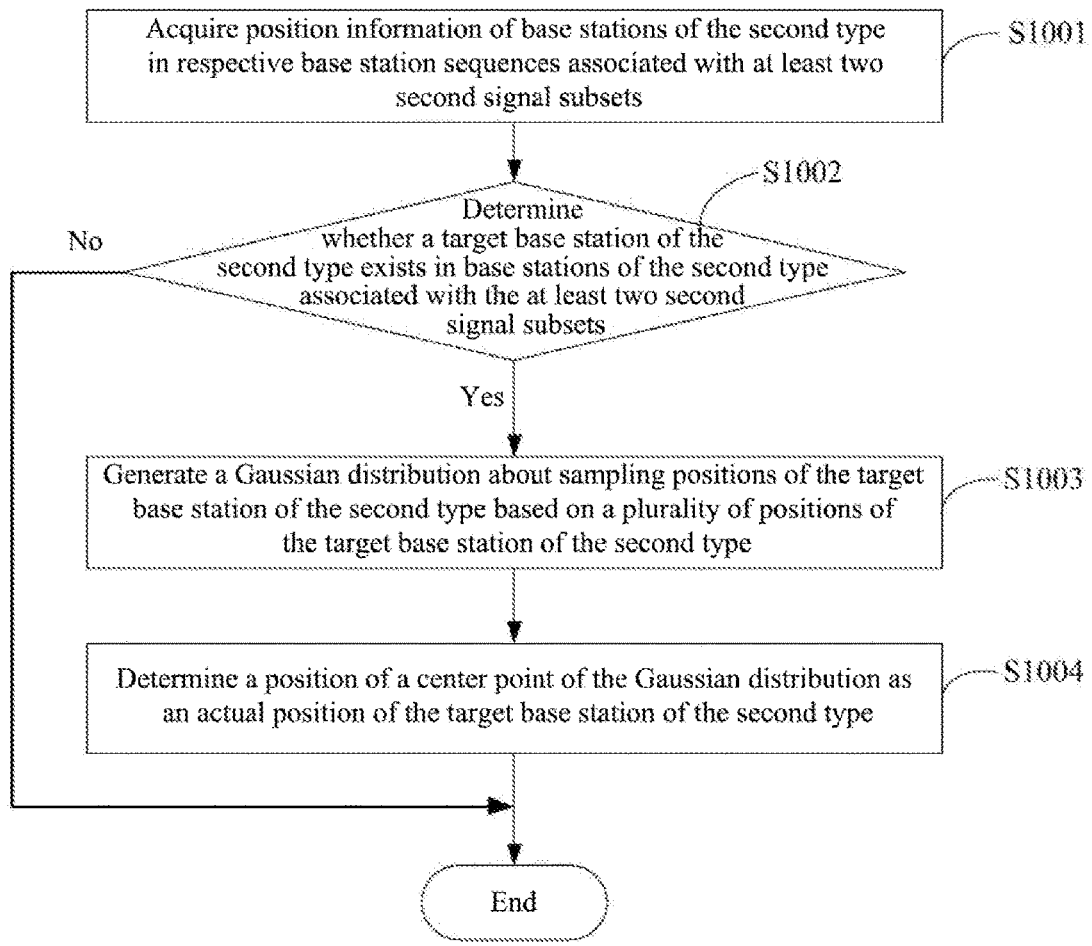
FIG. 10 is a schematic flowchart of a data processing method provided according to a third embodiment of the present disclosure.

On the basis of the embodiment shown in FIG. 6 described above, FIG. 10 is a schematic flowchart of a data processing method provided according to a third embodiment of the present disclosure. As shown in FIG. 10, in an embodiment of the present disclosure, the number of the above-mentioned second signal subsets is at least two; correspondingly, S504 mentioned above may further include the following steps:

S1001, acquire position information of base stations of the second type in respective base station sequences associated with at least two second signal subsets.

In an implementation, since the signal set to be processed is a set of sent-back signals of user terminals, the signal set to be processed includes a plurality of signal subsets uploaded by different user terminals. Therefore, at least two second signal subsets can be screened out from the signal set to be processed based on whether signals carry the same user identifier, and signals of each second signal subset carry the same user identifier.

In this embodiment, since the embodiment shown in FIG. 6 mentioned above provides a solution that for a second signal subset, the position information of the base station of the second type in the base station sequence associated with the second signal subset is determined, and therefore, for each second signal subset of the at least two second signal subsets, the processing device may also determine the position information of the base station of the second type in the base station sequence associated with each second signal subset.

S1002, determine whether a target base station of the second type exists in base stations of the second type associated with the at least two second signal subsets; if so, proceed to S1003 and S1004, but if not, end.

The target base station of the second type has a plurality of positions.

Illustratively, after determining all base stations of the second type associated with the at least two second signal subsets, whether a plurality of base stations of the second type with the same identifier exist in all base stations of the second type may be determined based on the base station identifier of each of the base stations of the second type; and if a plurality of base stations of the second type with the same identifier exist in the all base stations of the second type, the plurality of base stations of the second type with the same identifier are referred to as the target base station of the second type in this embodiment. That is, this step is mainly used to determine multiple pieces of position information of a base stations of the second type according to the position information of each of the base stations of the second type determined in S1001.

S1003, generate a Gaussian distribution about sampling positions of the target base station of the second type based on a plurality of positions of the target base station of the second type.

As an example, in response to the existence of the target base station of the second type in the base stations of the second type associated with the at least two second signal subsets, at this time, the sampling positions of the target base station of the second type can be modeled based on multiple pieces of position information corresponding to the target base station of the second type, to generate the Gaussian distribution about the sampling positions of the target base station of the second type.

Figure 11:
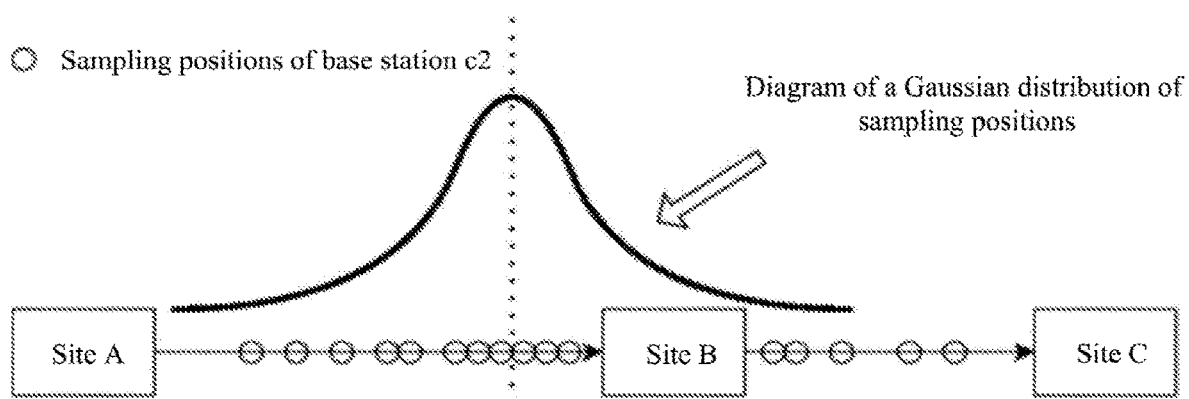
FIG. 11 is a schematic diagram of a Gaussian distribution that is established with sampling positions of base station c2 in FIG. 9.

Illustratively, FIG. 11 is a schematic diagram of a Gaussian distribution that is established with sampling positions of base station c2 in FIG. 9. As shown in FIG. 11, the position deducing method in this embodiment is a timing sequence sampling method, and a Gaussian distribution diagram as shown in FIG. 11 can be generated by using multiple sampling positions of base station c2.

S1004, determine a position of a center point of the Gaussian distribution as an actual position of the target base station of the second type.

The deducing method used in this solution is the "timing sequence sampling method". For example, the Gaussian distribution of the sampling positions where base station c2 appears is as shown in FIG. 11, in which the hollow circles are the sampling positions of base station c2, and at this time, it can be considered that the position of the center point of the Gaussian distribution has the highest probability, which can be taken as the actual position of base station c2.

In the embodiment of the present disclosure, the number of the second signal subsets is at least two, and at this time, the position information of the base stations of the second type in respective base station sequences associated with the at least two second signal subsets may also be acquired; for the target base station of the second type with a plurality of positions, the Gaussian distribution about the sampling positions of the target base station of the second type is generated based on the plurality of positions of the target base station of the second type, and the position of the center point of the Gaussian distribution is determined as the actual position of the target base station of the second type. The technical solution improves the accuracy of the determined position of the base station of the second type.

Figure 12:
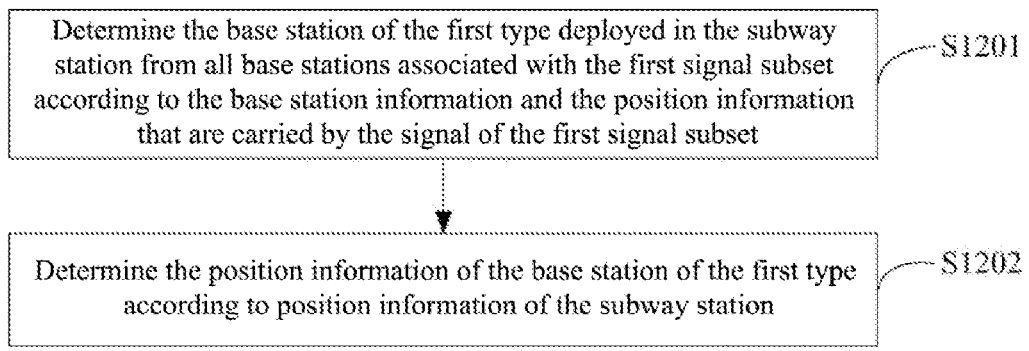
FIG. 12 is a schematic flowchart of a data processing method provided according to a fourth embodiment of the present disclosure.

Illustratively, FIG. 12 is a schematic flowchart of a data processing method provided according to a fourth embodiment of the present disclosure. As shown in FIG. 12, in an embodiment of the present disclosure, S503 mentioned above may be implemented by the following steps:

S1201, determine the base station of the first type deployed in the subway station from all base stations associated with the first signal subset, according to the base station information and the position information that are carried by the signal of the first signal subset.

In practical applications, the signal of the first signal subset may be a signal collected and reported by a user terminal at the collection point of the base station position. Therefore, all base stations associated with the first signal subset may include not only the base station of the first type deployed in the subway station, but also the base station of the third type deployed on the ground. Therefore, in this step, the base station of the first type deployed in the subway station needs to be determined from all base stations associated with the first signal subset.

In a possible implementation of this embodiment, step S1201 may be implemented by following steps:

B1, cluster base station signals in the first signal subset according to the position information and the base station information that are carried by the signal of the first signal subset, to determine at least one base station signal cluster; and B2, determine the base station of the first type deployed in the subway station, based on positional distribution information of the at least one base station signal cluster and subway entrance distribution information of a position where the at least one base station signal cluster is located.

Illustratively, for the first signal subset, the classification may be performed by signal distribution (base station position distribution), for example, a clustering algorithm is used to perform position clustering on the base station signals in the first signal subset, to determine the at least one base station signal cluster corresponding to the first signal subset, and then the base station of the first type in the base stations associated with the first signal subset is determined using the positional distribution information of the base station signal cluster and the subway entrance distribution information of a position where the base station signal cluster is located.

For example, for a base station signal cluster of the at least one base station signal cluster, the positional distribution information of the base station signal cluster may be processed based on a Gaussian mixture model, to determine a central position and an eigenvalue matrix of the base station signal cluster; then the covariance between the central position and other positions in the base station signal cluster is determined according to the central position and the eigenvalue matrix of the base station signal cluster; then a type of the base station at a position where the base station signal cluster is located is determined according to the central position of the base station signal cluster, the covariance between the central position and other positions in the base station signal cluster, and the subway entrance distribution information of the position where the base station signal cluster is located; and finally the base station of the first type deployed in the subway station is determined according to the type of the base station at the position where the at least one base station signal cluster is located.

Figure 13:
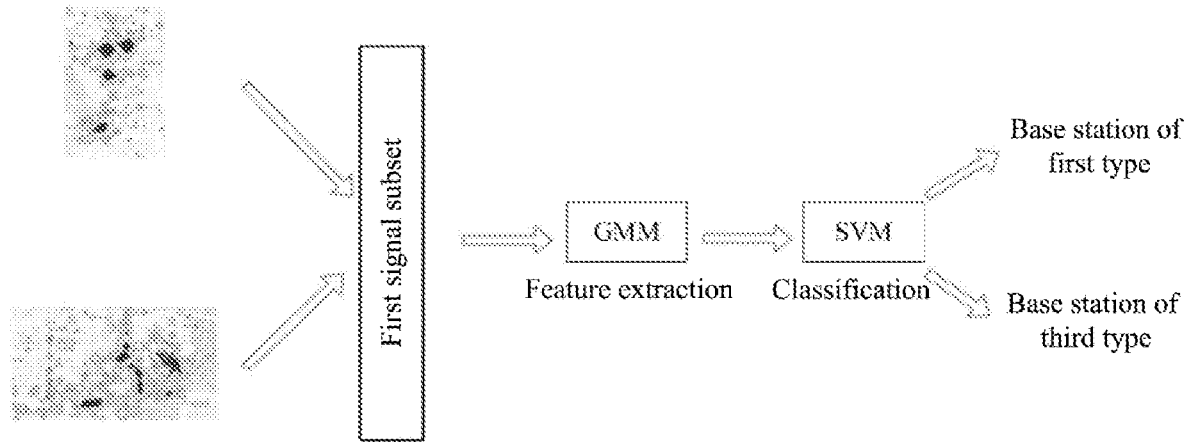
FIG. 13 is a schematic diagram of performing feature extraction and base station classification on signal distribution of a first signal subset.

Illustratively, FIG. 13 is a schematic diagram of performing feature extraction and base station classification on signal distribution of a first signal subset. As shown in FIG. 13, for a first signal subset composed of the signal distribution of the base station of the first type and the signal distribution of the base station of the third type, feature extraction is performed through a Gaussian mixed model (GMM) and then classification is performed using a support vector machine (SVM), and then the base station of the first type and the base station of the third type may be determined.

In an implementation, GMM refers to a linear combination of a plurality of Gaussian distribution functions. In theory, GMM can fit any type of distribution and is typically used to solve the situation where data under the same set contains a plurality of different distributions. Therefore, in this embodiment, GMM can be used to deduce the central position and eigenvalue matrix of each base station signal cluster, then the covariance between the central position and other positions in the base station signal cluster is calculated, and then the types of base stations are classified through an SVM method. The SVM is substantially a binary classification model, which can divide the base stations associated with the first signal subset into the base station of the first type and the base station of the third type (ground base station) with reference to the subway entrance distribution information of the position where the base station signal cluster is located.

S1202, determine the position information of the base station of the first type according to position information of the subway station.

In an implementation, after the base station of the first type deployed in the subway station is determined, the position of the base station of the first type may be performed with processing of "being bound to a station" to solve the problem of random jumping of the positioning position.

Illustratively, it is possible to first determine a central position of the subway station according to the position information of the subway station, and then determine the central position of the subway station as the position of the base station of the first type.

Figure 14:
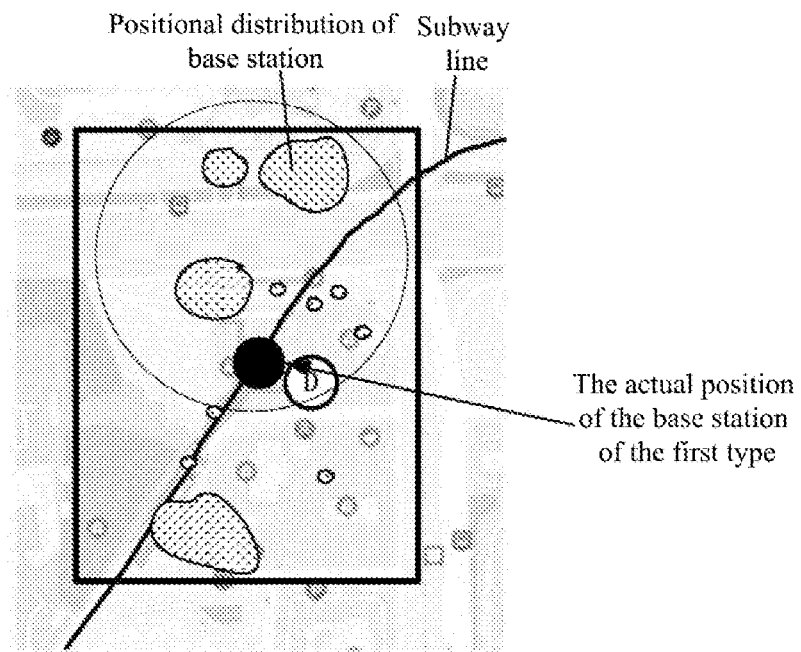
FIG. 14 is a schematic diagram of actual positional distribution of the base station of the first type.

For example, FIG. 14 is a schematic diagram of the actual position distribution of the base station of the first type. As shown in FIG. 14, according to the position distribution of the base stations in the current subway station, it can be determined that the actual range of the subway station is the part in the black box in the figure, in which the position corresponding to the solid black point is the central position of the subway station. In this embodiment, in order to avoid the positioning position of a user in the subway station jumping randomly, the position corresponding to the solid black point can be determined as the actual position of the base station in the subway station.

In the embodiment of the present disclosure, the base station of the first type deployed in the subway station is determined from all of the base stations associated with the first signal subset according to the base station information and the position information that are carried by the signal of the first signal subset, and the position information of the base station of the first type is determined according to the position information of the subway station. In the technical solution, the position where the base station of the first type in the subway station is located is set as the central position of the subway station, which optimizes the problem of random jumping of positioning in the subway station and improves the use experience of a user.

Illustratively, in an embodiment of the present disclosure, the signal processing method may further include:
receiving a positioning request from a terminal device, where the positioning request carries an access base station identifier of the terminal device; acquiring position information of an access base station corresponding to the access base station identifier; determining the position information of access base station as a current position of the terminal device; and finally sending the current position to the terminal device.

In an implementation, in a practical application, when a user opens a navigation application of a terminal device and uses the network provided by the access base station to request position positioning, the terminal device may send a positioning request to the processing device through the navigation application. At this time, the positioning request may carry the identifier of the access base station. Accordingly, when the processing device receives the positioning request, it can determine the identifier of the access base station by analyzing the positioning request, then determine the position information of the access base station as the current position of the terminal device in conjunction with the actual positions of various types of base stations determined by the technical solution provided according to the embodiments mentioned above, and finally send the current position to the terminal device to cause the terminal device to be displayed in the navigation application, so that the user obtains the accurate positioning position in time.

It can be understood that the technical solution of this embodiment does not limit the specific content carried by the positioning request, for example, the positioning request may also include a user identifier and so on, which is not limited here.

Figure 15:
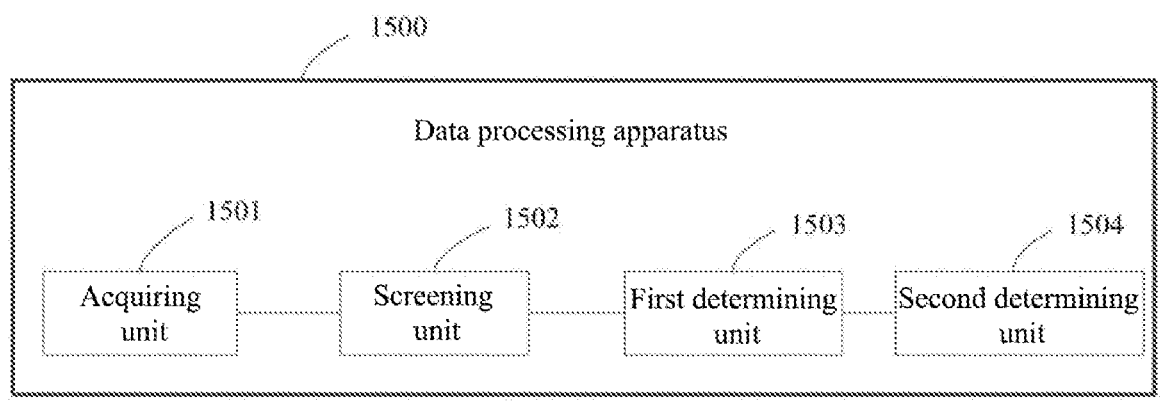
FIG. 15 is a schematic structural diagram of a data processing apparatus provided according to an embodiment of the present disclosure.

FIG. 15 is a schematic structural diagram of a data processing apparatus provided according to an embodiment of the present disclosure. The data processing apparatus provided according to this embodiment may be a processing device or an apparatus in a processing device. As shown in FIG. 15, the data processing apparatus 1500 provided according to the embodiment of the present disclosure may include:
a first acquiring unit 1501, configured to acquire a signal set to be processed, where a signal of the signal set to be processed carries base station information and base station access time;
a screening unit 1502, configured to determine a first signal subset of the signal set to be processed, where a signal of the first signal subset further carries position information;
a first determining unit 1503, configured to determine, according to the base station information and the position information that are carried by the signal of the first signal subset, position information of a base station of a first type deployed in a subway station; and
a second determining unit 1504, configured to determine, according to the position information of the base station of the first type, and the base station information and the base station access time that are carried by the signal of the signal set to be processed, position information of a base station of a second type deployed in a subway tunnel.

In a possible implementation of the embodiment of the present disclosure, the second determining unit 1504 includes:
a screening module, configured to determine a second signal subset of the signal set to be processed, where signals of the second signal subset carry a same user identifier;
a first processing module, configured to determine, according to the base station access time carried by the signal of the second signal subset, a base station sequence associated with the second signal subset and an access time interval of two adjacent base stations in the base station sequence;
a classifying module, configured to determine, according to base station information of the base station of the first type and information of base stations in the base station sequence, the base station of the first type and the base station of the second type in the base station sequence, where the base station of the second type is a base station deployed in a subway tunnel; and
a second processing module, configured to determine, according to the position information of the base station of the first type in the base station sequence and the access time interval of two adjacent base stations in the base station sequence, the position information of the base station of the second type in the base station sequence.

In an implementation, the number of the second signal subsets is at least two; the second determining unit 1504 further includes:
an acquiring module, configured to acquire position information of base stations of the second type in respective base station sequences associated with at least two second signal subsets;
a determining module, configured to determine whether a target base station of the second type exists in the base stations of the second type associated with the at least two second signal subsets, where the target base station of the second type has a plurality of positions; and a generating module, configured to in response to the existence of the target base station of the second type in the base stations of the second type associated with the at least two second signal subsets, generate a Gaussian distribution about sampling positions of the target base station of the second type based on the plurality of positions of the target base station of the second type;

where the second processing module is further configured to determine a position of a center point of the Gaussian distribution as an actual position of the target base station of the second type.

In a possible implementation of the embodiment of the present disclosure, the first determining unit 1503 includes:

a first determining module, configured to determine the base station of the first type deployed in the subway station from all base stations associated with the first signal subset according to the base station information and the position information that are carried by the signal of the first signal subset; and a second determining module, configured to determine the position information of the base station of first type according to position information of the subway station.

In an implementation, the first determining module includes:

a clustering submodule, configured to cluster signals in the first signal subset according to the position information and the base station information that are carried by the signal of the first signal subset, to determine at least one base station signal cluster; and a first determining submodule, configured to determine the base station of the first type deployed in the subway station, based on positional distribution information of the at least one base station signal cluster and subway entrance distribution information of a position where the at least one base station signal cluster is located.

In an implementation, the first determining submodule is specifically configured to:

for a base station signal cluster of the at least one base station signal cluster, process positional distribution information of the base station signal cluster based on a Gaussian mixture model to determine a central position and an eigenvalue matrix of the base station signal cluster;

determine covariance between the central position and other positions in the base station signal cluster according to the central position and the eigenvalue matrix of the base station signal cluster;

determine, according to the central position of the base station signal cluster, the covariance between the central position and other positions in the base station signal cluster, and subway entrance distribution information of a position where the base station signal cluster is located, a type of a base station at the position where the base station signal cluster is located; and determine, according to the type of the base station at the position where the at least one base station signal cluster is located, the base station of the first type deployed in the subway station.

In a possible implementation of the embodiment of the present disclosure, the second determining module includes:

a second determining submodule, configured to determine a central position of the subway station according to the position information of the subway station; and a third determining submodule, configured to determine the central position of the subway station as a position of the base station of the first type.

In a possible implementation of the embodiment of the present disclosure, the signal processing apparatus further includes:

a receiving unit (not shown), configured to receive a positioning request from a terminal device, where the positioning request carries an access base station identifier of the terminal device;

a second acquiring unit (not shown), configured to acquire position information of an access base station corresponding to the access base station identifier;

a third determining unit (not shown), configured to determine the position information of the access base station as a current position of the terminal device; and a sending unit (not shown), configured to send the current position to the terminal device.

The data processing apparatus provided in this embodiment can be used for executing the data processing method executed by the processing device in any of the above method embodiments, and the implementation principle and technical effect thereof are similar, which will not be repeated here.

According to an embodiment of the present disclosure, the present disclosure also provides an electronic device, a readable storage medium, and a computer program product.

According to an embodiment of present disclosure, the present disclosure also provides a computer program product, and the computer program product includes: a computer program, which is stored in a readable storage medium, where at least one processor of an electronic device may read the computer program from the readable storage medium, and the at least one processor executes the computer program to cause the electronic device to execute the solution provided according to any one of the embodiments described above.

Figure 16:
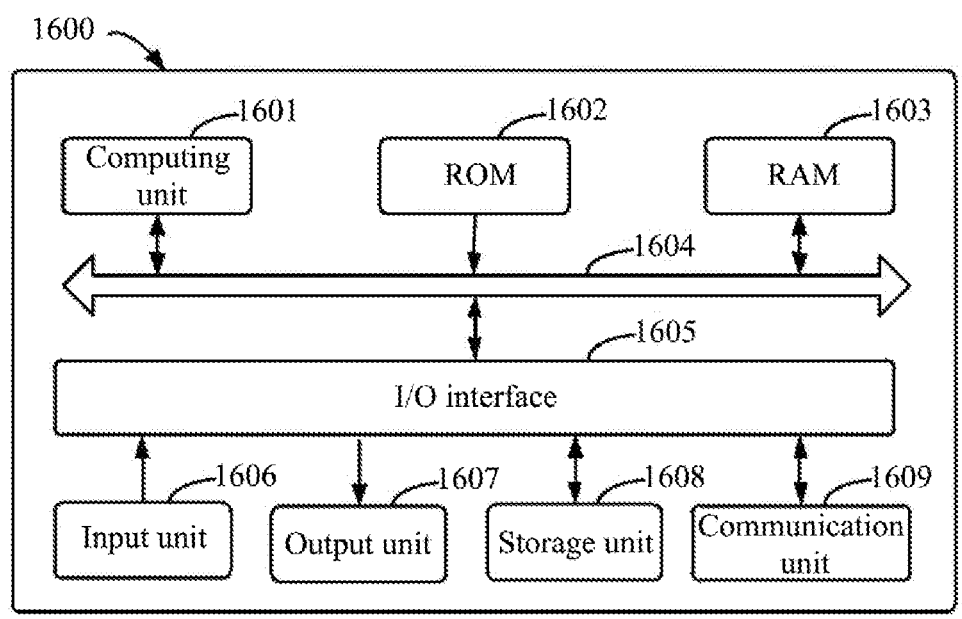
FIG. 16 is a schematic block diagram of an example electronic device used to implement the embodiments of the present disclosure.

FIG. 16 is a schematic block diagram of an example electronic device used for implementing the embodiments of the present disclosure. The electronic device is intended to represent various forms of digital computers, such as a laptop computer, a desktop computer, a workstation, a personal digital assistant, a server, a blade server, a large computer, and other computers as appropriate. The electronic device may also represent various forms of mobile devices, such as a personal digital assistant, a cellular phone, a smart phone, a wearable device, and other similar computing apparatuses. The components shown herein, their connections and relationships, and their functions are merely examples and are not intended to limit the implementation of the present disclosure described and/or claimed herein.

As shown in FIG. 16, the device 1600 includes a computing unit 1601, which can execute various appropriate actions and processing according to a computer program stored in a read-only memory (ROM) 1602 or a computer program loaded from a storage unit 1608 into a random access memory (RAM) 1603. In the RAM 1603, various programs and data necessary for the operation of the device 1600 may also be stored therein. The computing unit 1601, the ROM 1602, and the RAM 1603 are connected to each other through a bus 1604. An input/output (I/O) interface 1605 is also connected to bus 1604.

A plurality of components in the device 1600 are connected to the I/O interface 1605, the plurality of components includes: an input unit 1606, such as a keyboard, a mouse, or the like; an output unit 1607, such as various types of displays, speakers, and so on; a storage unit 1608, such as a magnetic disk, an optical disk, and the like; and a communication unit 1609, such as a network card, a modem, a wireless communication transceiver, and the like. The communication unit 1609 allows the device 1600 to exchange information/data with other devices through a computer network such as the Internet and/or various telecommunication networks.

The computing unit 1601 may be various general-purpose and/or special-purpose processing components with processing and computing capabilities. Some examples of the computing unit 1601 include, but are not limited to, a central processing unit (CPU), a graphics processing unit (GPU), various dedicated artificial intelligence (AI) computing chips, various computing units that run a machine learning model algorithm, a digital signal processor (DSP), and any appropriate processor, controller, microcontroller, and the like. The computing unit 1601 performs the various methods and processing described in the above content, for example, a signal processing method. For example, in some embodiments, the signal processing method may be implemented as a computer software program tangibly embodied in a machine-readable medium, such as the storage unit 1608. In some embodiments, part or all of a computer program may be loaded into and/or installed on the device 1600 via the ROM 1602 and/or the communication unit 1609. When the computer program is loaded into the RAM 1603 and executed by the computing unit 1601, one or more steps of the signal processing method described in the above content may be performed. Alternatively, in other embodiments, the computing unit 1601 may be configured to execute the signal processing method by any other suitable means (e.g., by means of firmware).

Various implementations of the systems and the techniques described above herein may be implemented in a digital electronic circuit system, an integrated circuit system, a field programmable gate array (FPGA), an application specific integrated circuit (ASIC), an application specific standard product (ASSP), a system-on-chip system (SOC), a complex programmable logic device (CPLD), computer hardware, firmware, software, and/or combinations thereof. These various embodiments may include being implemented in one or more computer programs. The one or more computer programs may be executed and/or interpreted on a programmable system including at least one programmable processor, which may be a special purpose or general purpose programmable processor, and can receive data and instructions from a storage system, at least one input apparatus, and at least one output apparatus, and transmit the data and instructions to the storage system, the at least one input apparatus, and the at least one output apparatus.

The program code for implementing the methods of the present disclosure may be written in any combination of one or more programming languages. The program code may be provided to a processor or controller of a general purpose computer, a special purpose computer, or other programmable data processing apparatuses, so that the program code enables the functions/operations specified in flowcharts and/or block diagrams to be implemented when executed by the processor or the controller. The program code may be executed entirely on a machine, executed partly on a machine, executed as a stand-alone software package partly on a machine and partly on a remote machine, or executed entirely on a remote machine or a server.

In the context of the present disclosure, a machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, device, or any suitable combination of the above. The more specific examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In order to provide interaction with a user, the systems and techniques described herein may be implemented on a computer, which includes: a display apparatus for displaying information to a user (for example, a CRT (cathode ray tube) or LCD (liquid crystal display) monitor); and a keyboard and a pointing apparatus (for example, a mouse or a trackball) through which the user can provide input to the computer. Other types of apparatuses may also be used to provide interaction with a user, for example, the feedback provided to the user may be any form of sensory feedback (for example, visual feedback, auditory feedback, or tactile feedback); and input from the user may be received in any form (including acoustic input, voice input, or tactile input).

The systems and technologies described herein can be implemented in a computing system that includes a background component (for example, as a data server), a computing system that includes a middleware component (for example, an application server), or a computing system that includes a front-end component (for example, a user computer with a graphical user interface or web browser, where a user can interact with the implementations of the systems and technologies described herein through the graphical user interface or the web browser), or a computing system that includes any combination of such background component, middleware component or front-end component. The components of the system may be connected to each other through any form or medium of digital data communication (for example, a communication network). Examples of the communication network include: a local area network (LAN), a wide area network (WAN), and the Internet.

A computer system may include a client and a server. The client and server are typically far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system, to solve the defects of being difficult to manage and weak in business scalability in a traditional physical host and VPS service ("Virtual Private Server", or "VPS" for short). The server may also be a system of a distributed system or a server combined with a blockchain.

It should be understood that the various forms of processes shown above may be used to reorder, add, or delete a step. For example, the steps described in the present disclosure may be performed in parallel, sequentially, or in a different order, as long as the desired result of the technical solution disclosed in the present disclosure can be achieved, which is not limited herein.

The foregoing specific implementations do not constitute a limitation on the protection scope of the present disclosure.

Those skilled in the art should understand that various modifications, combinations, sub-combinations, and substitutions may be made according to design requirements and other factors. Any amendments, equivalent substitutions, and improvements made within the spirit and principle of the present disclosure shall be included in the protection scope of the present disclosure.

What is claimed is:

1. A signal processing method, comprising:
   acquiring a signal set to be processed, wherein a signal of the signal set to be processed carries base station information and base station access time;
   determining a first signal subset of the signal set to be processed, wherein a signal of the first signal subset further carries position information;
   determining, according to the base station information and the position information that are carried by the signal of the first signal subset, position information of a base station of a first type deployed in a subway station; and
   determining, according to the position information of the base station of the first type, and the base station information and the base station access time that are carried by the signal of the signal set to be processed, position information of a base station of a second type deployed in a subway tunnel;
   wherein the determining, according to the position information of the base station of the first type, and the base station information and the base station access time that are carried by the signal of the signal set to be processed, the position information of the base station of the second type deployed in the subway tunnel comprises:
   determining a second signal subset of the signal set to be processed, wherein signals of the second signal subset carry a same user identifier;
   determining, according to the base station access time carried by the signal of the second signal subset, a base station sequence associated with the second signal subset and an access time interval of two adjacent base stations in the base station sequence;
   determining, according to base station information of the base station of the first type and information of base stations in the base station sequence, the base station of the first type and the base station of the second type in the base station sequence, wherein the base station of the second type is a base station deployed in a subway tunnel; and
   determining, according to the position information of the base station of the first type in the base station sequence and the access time interval of two adjacent base stations in the base station sequence, the position information of the base station of the second type in the base station sequence;
   wherein a number of the second signal subset is at least two, and the determining, according to the position information of the base station of the first type, and the base station information and the base station access time that are carried by the signal of the signal set to be processed, the position information of the base station of the second type deployed in the subway tunnel further comprises:
   acquiring position information of base stations of the second type in respective base station sequences associated with at least two second signal subsets;
   determining whether a target base station of the second type exists in the base stations of the second type associated with the at least two second signal subsets, wherein the target base station of the second type has a plurality of positions;
   in response to the existence of the target base station of the second type in the base stations of the second type associated with the at least two second signal subsets, generating, based on the plurality of positions of the target base station of the second type, a Gaussian distribution about sampling positions of the target base station of the second type; and
   determining a position of a central point of the Gaussian distribution as an actual position of the target base station of the second type.

2. The method according to claim 1, wherein the determining, according to the base station information and the position information that are carried by the signal of the first signal subset, the position information of the base station of the first type deployed in the subway station comprises:
   determining, according to the base station information and the position information that are carried by the signal of the first signal subset, and from all base stations associated with the first signal subset, the base station of the first type deployed in the subway station; and
   determining the position information of the base station of the first type according to position information of the subway station.

3. The method according to claim 2, wherein the determining, according to the base station information and the position information that are carried by the signal of the first signal subset, and from the all-base stations associated with the first signal subset, the base station of the first type deployed in the subway station comprises:
   clustering, according to the position information and the base station information that are carried by the signal of the first signal subset, signals in the first signal subset to determine at least one base station signal cluster;
   determining, based on positional distribution information of the at least one base station signal cluster and subway entrance distribution information of a position where the at least one base station signal cluster is located, the base station of the first type deployed in the subway station.

4. The method according to claim 3, wherein the determining, based on the positional distribution information of the at least one base station signal cluster and the subway entrance distribution information of the position where the at least one base station signal cluster is located, the base station of the first type deployed in the subway station comprises:
   for a base station signal cluster of the at least one base station signal cluster, processing, based on a Gaussian mixture model, positional distribution information of the base station signal cluster to determine a central position and an eigenvalue matrix of the base station signal cluster;
   determining, according to the central position and the eigenvalue matrix of the base station signal cluster, covariance between the central position and other positions in the base station signal cluster;
   determining, according to the central position of the base station signal cluster, the covariance between the central position and other positions in the base station signal cluster, and subway entrance distribution information of a position where the base station signal cluster is located, a type of a base station at the position where the base station signal cluster is located; and determining, according to the type of the base station at the position where the at least one base station signal cluster is located, the base station of the first type deployed in the subway station.

5. The method according to claim 4, wherein the determining, according to the position information of the subway station, the position information of the base station of the first type comprises:
   determining, according to the position information of the subway station, a central position of the subway station; and
   determining the central position of the subway station as a position of the base station of the first type.

6. The method according to claim 3, wherein the determining, according to the position information of the subway station, the position information of the base station of the first type comprises:
   determining, according to the position information of the subway station, a central position of the subway station; and
   determining the central position of the subway station as a position of the base station of the first type.

7. The method according to claim 2, wherein the determining, according to the position information of the subway station, the position information of the base station of the first type comprises:
   determining, according to the position information of the subway station, a central position of the subway station; and
   determining the central position of the subway station as a position of the base station of the first type.

8. The method according to claim 1, further comprising:
   receiving a positioning request from a terminal device, wherein the positioning request carries an access base station identifier of the terminal device;
   acquiring position information of an access base station corresponding to the access base station identifier;
   determining the position information of the access base station as a current position of the terminal device; and
   sending the current position to the terminal device.

9. The method according to claim 1, wherein the determining, according to the base station information and the position information that are carried by the signal of the first signal subset, the position information of the base station of the first type deployed in the subway station comprises:
   determining, according to the base station information and the position information that are carried by the signal of the first signal subset, and from all base stations associated with the first signal subset, the base station of the first type deployed in the subway station; and
   determining the position information of the base station of the first type according to position information of the subway station.

10. A signal processing apparatus, comprising:
   at least one processor; and
   a memory communicatively connected to the at least one processor; wherein,
   the memory stores therein instructions executable by the at least one processor, and the instructions are executed by the at least one processor to cause the at least one processor to:
   acquire a signal set to be processed, wherein a signal of the signal set to be processed carries base station information and base station access time;
   determine a first signal subset of the signal set to be processed, wherein a signal of the first signal subset further carries position information;
   determine, according to the base station information and the position information that are carried by the signal of the first signal subset, position information of a base station of a first type deployed in a subway station; and
   determine, according to the position information of the base station of the first type, and the base station information and the base station access time that are carried by the signal of the signal set to be processed, position information of a base station of a second type deployed in a subway tunnel;
   wherein the instructions are executed by the at least one processor to cause the at least one processor to:
   determine a second signal subset of the signal set to be processed, wherein signals of the second signal subset carry a same user identifier;
   determine, according to the base station access time carried by the signal of the second signal subset, a base station sequence associated with the second signal subset and an access time interval of two adjacent base stations in the base station sequence;
   determine, according to base station information of the base station of the first type and information of base stations in the base station sequence, the base station of the first type and the base station of the second type in the base station sequence, wherein the base station of the second type is a base station deployed in a subway tunnel; and
   determine, according to the position information of the base station of the first type in the base station sequence and the access time interval of two adjacent base stations in the base station sequence, the position information of the base station of the second type in the base station sequence;
   wherein the instructions are executed by the at least one processor to cause the at least one processor to:
   acquire position information of base stations of the second type in respective base station sequences associated with at least two second signal subsets;
   determine whether a target base station of the second type exists in the base stations of the second type associated with the at least two second signal subsets, wherein the target base station of the second type has a plurality of positions;
   in response to the existence of the target base station of the second type in the base stations of the second type associated with the at least two second signal subsets, generate, based on the plurality of positions of the target base station of the second type, a Gaussian distribution about sampling positions of the target base station of the second type; and
   determine a position of a center point of the Gaussian distribution as an actual position of the target base station of the second type.

11. The apparatus according to claim 10, wherein the instructions are executed by the at least one processor to cause the at least one processor to:
   determine, according to the base station information and the position information that are carried by the signal of the first signal subset, and from all base stations associated with the first signal subset, the base station of the first type deployed in the subway station; and
   determine the position information of the base station of the first type according to position information of the subway station.

12. The apparatus according to claim 11, wherein the instructions are executed by the at least one processor to cause the at least one processor to:
- cluster, according to the position information and the base station information that are carried by the signal of the first signal subset, signals in the first signal subset to determine at least one base station signal cluster; and
- determine, based on positional distribution information of the at least one base station signal cluster and subway entrance distribution information of a position where the at least one base station signal cluster is located, the base station of the first type deployed in the subway station.

13. The apparatus according to claim 12, wherein the instructions are executed by the at least one processor to cause the at least one processor to:
- for a base station signal cluster of the at least one base station signal cluster, process, based on a Gaussian mixture model, positional distribution information of the base station signal cluster to determine a central position and an eigenvalue matrix of the base station signal cluster;
- determine, according to the central position and the eigenvalue matrix of the base station signal cluster, covariance between the central position and other positions in the base station signal cluster;
- determine, according to the central position of the base station signal cluster, the covariance between the central position and other positions in the base station signal cluster, and subway entrance distribution information of a position where the base station signal cluster is located, a type of a base station at the position where the base station signal cluster is located; and
- determine, according to the type of the base station at the position where the at least one base station signal cluster is located, the base station of the first type deployed in the subway station.

14. The apparatus according to claim 11, wherein the instructions are executed by the at least one processor to cause the at least one processor to:
- determine, according to the position information of the subway station, a central position of the subway station; and
- determine the central position of the subway station as a position of the base station of first type.

15. The apparatus according to claim 10, the instructions are executed by the at least one processor to cause the at least one processor to:
- receive a positioning request from a terminal device, wherein the positioning request carries an access base station identifier of the terminal device;
- acquire position information of an access base station corresponding to the access base station identifier;
- determine the position information of the access base station as a current position of the terminal device; and
- send the current position to the terminal device.

16. A non-transitory computer-readable storage medium, which stores therein computer instructions, wherein the computer instructions are used to cause a computer to:
- acquire a signal set to be processed, wherein a signal of the signal set to be processed carries base station information and base station access time;
- determine a first signal subset of the signal set to be processed, wherein a signal of the first signal subset further carries position information;
- determine, according to the base station information and the position information that are carried by the signal of the first signal subset, position information of a base station of a first type deployed in a subway station; and
- determine, according to the position information of the base station of the first type, and the base station information and the base station access time that are carried by the signal of the signal set to be processed, position information of a base station of a second type deployed in a subway tunnel;

wherein the computer instructions further cause the computer to:
- determine a second signal subset of the signal set to be processed, wherein signals of the second signal subset carry a same user identifier;
- determine, according to the base station access time carried by the signal of the second signal subset, a base station sequence associated with the second signal subset and an access time interval of two adjacent base stations in the base station sequence;
- determine, according to base station information of the base station of the first type and information of base stations in the base station sequence, the base station of the first type and the base station of the second type in the base station sequence, wherein the base station of the second type is a base station deployed in a subway tunnel; and
- determine, according to the position information of the base station of the first type in the base station sequence and the access time interval of two adjacent base stations in the base station sequence, the position information of the base station of the second type in the base station sequence;

wherein the computer instructions further cause the computer to:
- acquire position information of base stations of the second type in respective base station sequences associated with at least two second signal subsets;
- determine whether a target base station of the second type exists in the base stations of the second type associated with the at least two second signal subsets, wherein the target base station of the second type has a plurality of positions;
- in response to the existence of the target base station of the second type in the base stations of the second type associated with the at least two second signal subsets, generate, based on the plurality of positions of the target base station of the second type, a Gaussian distribution about sampling positions of the target base station of the second type; and
- determine a position of a center point of the Gaussian distribution as an actual position of the target base station of the second type.

* * * * *